(12) United States Patent
Parker

(10) Patent No.: US 8,077,089 B2
(45) Date of Patent: Dec. 13, 2011

(54) PRECISION GEOLOCATION OF MOVING OR FIXED TRANSMITTERS USING MULTIPLE OBSERVERS

(75) Inventor: Michael Noel Parker, Tucson, AZ (US)

(73) Assignee: Rincon Research Corporation, Tucson, AZ (US)

( * ) Notice: Subject to any disclaimer, the term of this patent is extended or adjusted under 35 U.S.C. 154(b) by 306 days.

(21) Appl. No.: 12/542,541

(22) Filed: Aug. 17, 2009

(65) Prior Publication Data

US 2011/0273328 A1 Nov. 10, 2011

Related U.S. Application Data

(62) Division of application No. 11/464,762, filed on Aug. 15, 2006, now abandoned.

(51) Int. Cl.
*G01S 5/04* (2006.01)
*G01S 1/18* (2006.01)
(52) U.S. Cl. ........................................ 342/442; 342/413
(58) Field of Classification Search .................. 342/424, 342/442–444, 413
See application file for complete search history.

(56) References Cited

U.S. PATENT DOCUMENTS

| | | | |
|---|---|---|---|
| 6,219,385 B1 | 4/2001 | Weinberg | |
| 6,249,542 B1 | 6/2001 | Kohli et al. | |
| 7,050,002 B1 | 5/2006 | Wright et al. | |
| 7,213,442 B2 * | 5/2007 | Workman | 73/1.82 |
| 2006/0114157 A1 * | 6/2006 | Kolanek et al. | 342/424 |
| 2007/0115174 A1 * | 5/2007 | Herrick | 342/420 |

OTHER PUBLICATIONS

Blomenhofer, Helmut, Hein, Gunter W., and Walsh, David, IAPG, University FAF Munich, "On-The-Fly Carrier Phase Ambiguity Resolution for Precise Aircraft Landing," Sixth International Technical Meeting of Satellite Division of The Satellite Division of the Institute of Navigation, 1993, pp. 821-830.

Erickson, Caroline, The University of Calgary, Canada, "An Analysis of Ambiguity Resolution Techniques for Rapid Static GPS Surveys Using Single Frequency Data," Fifth International Technical Meeting of Satellite Division of The Satellite Division of the Institute of Navigation, 1992, pp. 453-462.

* cited by examiner

*Primary Examiner* — Thomas Tarcza
*Assistant Examiner* — Nga X Nguyen
(74) *Attorney, Agent, or Firm* — Quarles & Brady LLP

(57) ABSTRACT

A method of geolocating a stationary transmitter observed by a fixed receiver device and at least two receiver devices, at least one of the receiver devices moving includes obtaining wavelength-scaled phase difference measurements between pairs of receiver devices, and obtaining a result lattice of possible locations of the transmitter, one location more probable than the remainder. A method of geolocating a moving transmitter observed by a plurality of fixed or nearly fixed receiver devices, and a moving receiver device, includes obtaining wavelength-scaled phase difference measurements from the plurality of fixed or nearly fixed receiver devices to obtain a shape of the transmitter trajectory, measuring the phase difference between the moving receiver device and at least one of the plurality of fixed or nearly fixed receiver devices to obtain a phase error residual, and moving an estimated starting point of the transmitter to obtain a best-fit residual.

7 Claims, 1 Drawing Sheet

PRECISION GEOLOCATION OF MOVING OR FIXED TRANSMITTERS USING MULTIPLE OBSERVERS

CROSS-REFERENCE TO RELATED APPLICATIONS

This application a divisional of U.S. patent application Ser. No. 11/464,762 filed Aug. 15, 2006, the disclosure of which is hereby incorporated by reference as if set forth in its entirety herein.

BACKGROUND OF THE INVENTION

1. Field of the Invention

The present invention relates in general to geolocation technology using radio waves, and, more particularly, to a system and method of precise geolocation of moving or fixed transmitters using multiple observers.

2. Description of the Prior Art

A technology known as Kinematic Ambiguity Resolution (KAR) has been developed for precision tracking using global positioning system (GPS) receivers that receive signals from many GPS satellites. The fundamental approach is to use carrier phase observations of many GPS satellites to determine the location of a static or moving GPS receiver. Under favorable circumstances, the location of a moving GPS antenna can be fixed to centimeter accuracy within seconds.

At a fundamental level KAR involves measuring range to GPS satellites using carrier phase. Extremely precise measurements can be made on carrier phase, usually better than $\frac{1}{100}$ of a wavelength. Unfortunately these phase measurements have an ambiguity as to which cycle one is measuring. For example the GPS C/A code has a wavelength of 19 cm. One might be able to measure the carrier phase and determine the exact location of the wave to 1 mm, but with an ambiguity of 19 cm. If one knew the transmission time of the measured cycle, the location of the transmitter, and all propagation effects then the phase measurement determines the range to the satellite with an ambiguity of 19 cm. So the GPS receiver's antenna phase center is known to be on one of many spherical shells centered on the satellite.

Typically the time at the GPS receiver is not precisely known, so in order to fix a three-dimensional position in space, one must measure the signal from at least four GPS satellites. This allows solution of three position coordinates and time of the GPS receiver. When observing the time of arrival of the PN signal modulated onto the carrier, this is sufficient to fix a unique location. However this location accuracy is limited by the precision with which the modulation time of arrival can be measured. And this is, in turn, limited by the bandwidth of the modulation. GPS signals have modulation bandwidths of 1 and 10 MHz, so one can make relatively accurate measurements of the location based on timing the modulation alone. This allows one to estimate the location of the GPS antenna to the level of meters.

Making measurements on the carrier phase instead of the modulation has the potential of improving the position fix accuracy from meters to millimeters. Unfortunately, because of the ambiguity in carrier phase measurement, there are a multiplicity of locations where the antenna might be. These possible locations form a lattice pattern with spacing typically on the order of a wavelength apart. The details of this lattice vary depending upon the geometry of the GPS satellites. If one can resolve which of the possible locations is the true location, then determining location to millimeter accuracies becomes merely a matter of eliminating all the biases may creep into the entire system. Examples of biases include errors in satellite position, changes in the phase center of the GPS antenna with angle, local multipath reflections, tropospheric propagation effects, and ionospheric propagation effects. We will discuss elimination of biases at a later time. For now we will focus on the difficult problem of resolving the ambiguities.

If the GPS receiver is fixed, a possible way to resolve the ambiguities is to wait while a GPS satellite moves to present a different geometry. One might start with a lattice of possible GPS locations and with successive measurements (with different GPS geometries) compute new lattice. The lattice point corresponding to the true location will remain static while the other points move. With enough satellite geometry change, the true location will become apparent. Another approach is to choose an army of lattice points that best fit the observed data. Then one calculates the residual rms phase error, the rms of (measured phase−calculated phase) summed over all satellites. Eventually the true location's rms phase error will be much better than the rms phase error of the incorrect ambiguities.

Unfortunately GPS satellites move slowly. Fortunately there are a lot of GPS satellites, and each transmits two different wavelengths. Observing with two wavelengths simultaneously allows one to eliminate ambiguities. In the case of GPS, the ambiguities of both carrier wavelengths are spaced at a distance where the shorter wavelength has exactly one more cycle than the longer wavelength. This distance, known as the wide-lane ambiguity, is about 0.9 meter. Observing more than four GPS satellites serves to improve precision. A fifth satellite with a good geometry will add phase measurement data that matches the true location, and not many others. Unfortunately, measurement errors create uncertainty as to whether a particular ambiguity matches the data or not. Usually the procedure is to determine the lattice of possible locations, and calculate the rms phase error associated with each one. If one location produces much better rms errors than all the others (e.g., by a factor of three or more), then this location is deemed to be correct.

In order to successfully perform KAR, one must have a data set with little measurement error and bias. An approach to obtaining this data set has been to place a second GPS receiver near to the location where KAR is being performed. This receiver is used as a Reference station. It observes each of the satellites being collected by the GPS receiver and saves measurements on the code and especially the carrier phase. Even though the two receivers are separated, many of the errors due to satellite position, atmospheric propagation, and ionospheric propagation appear in common at both receivers. So by subtracting the Reference's data from the Rover's data, a new data set with less error is generated. With GPS, KAR works best when the reference receiver is within 10 km of the rover's position. As separation is increased, separate propagation paths through different parts of the atmosphere and ionosphere reduces the amount of error that is correctable.

Geolocating a non-cooperative transmitter observed by multiple collectors differs significantly from the GPS problem previously described. In the first instance, a complication is presented by the fact that transmitter waveforms are commonly not designed for the task at hand. Instead of measuring the phase of transmitter carriers locked to stable Rb or Cs oscillators, one is faced with a signal that may be drifting in frequency and that may not even have a carrier. In addition, the signal may be narrow-band modulated so that instead of Time-Difference-of-Arrival (TDOA) measurements on the signal constraining the search region needing to resolve possible ambiguities to perhaps 10 meters, the search region may be 1 km or more.

The typical approach to geolocating such a signal is to cross-correlate the signal seen at different collectors. The peak of the cross-correlation function in TDOA is used to define hyperboloids on which the transmitter must lie. The rate of change in phase of the cross-correlation function's peak is used to define the Frequency-Difference-of-Arrival (FDOA). FDOAs also define surfaces on which the transmitter must lie if the transmitter isn't moving. However, if the transmitter is moving, then FDOA measures a composite of the transmitter and collector velocity. It is commonly thought that phase vs. time measurements cannot determine a transmitter's location if it is moving.

In light of the foregoing, a need exists for a precise system and method of geolocating a transmitter which is observed by collector devices which are fixed or moving. In addition, a need exists for a geolocation system and method which serves to alleviate the problems of geolocating a non-cooperative transmitter as described.

SUMMARY OF THE INVENTION

In one embodiment, the present invention is a method of geolocating a moving transmitter at position $\vec{X}_o(t)$ observed by a plurality (N) of moving collector devices at positions $\vec{X}_i(t)$, comprising obtaining (N−1) wavelength-scaled phase difference measurements taken from independent pairwise combinations of the plurality of moving collector devices at a plurality of discrete times, the first measurement taken at k=0, according to $$\Delta\Phi(k)_{ij} = \Phi_j(k) - \Phi_i(k), \text{ and } \Phi_i(k) = |\vec{X}_i(k) - \vec{X}_o(k)|/\lambda + \Theta_i,$$
where i and j are each one of the plurality of collectors (i,j=1, 2, ..., N), $\Theta_i$ and $\Theta_j$ are unknown constant phase offsets of the plurality of moving collector devices, λ is the transmitter wavelength, and k is the discrete time, and solving for an unknown three-dimensional position in space, or if the moving transmitter is known to be on a surface of or at a known altitude above the earth, solving for a position in two dimensions.

In another embodiment, the present invention is a method of geolocating a stationary transmitter observed by at least two receiver devices, at least one of the receiver devices moving, comprising calibrating each of the receiver devices to reduce unknown phase bias and location bias, obtaining wavelength-scaled phase difference measurements between pairs of receiver devices, and obtaining a result lattice of possible locations of the transmitter, one location more probable than the remainder.

In another embodiment, the present invention is a method of geolocating a moving transmitter observed by a plurality of fixed or nearly fixed receiver devices, and a moving receiver device, comprising obtaining wavelength-scaled phase difference measurements from the plurality of fixed or nearly fixed receiver devices to obtain a shape of the transmitter trajectory, measuring the phase difference between the moving receiver device and at least one of the plurality of fixed or nearly fixed receiver devices to obtain a phase error residual, and moving an estimated starting point of the transmitter to obtain a best-fit residual.

In still another embodiment, the present invention is a method of imaging and geolocating a plurality of fixed transmitters and multipath components observed by two receivers, at least one of the two receivers moving, comprising, for each possible transmitter location, performing complex-conjugate product calculations between the two receivers, summing the product calculations with range compensation based on the shape of a path of the moving receiver to form an image of the plurality of fixed transmitters and multipath components. GPS is used to determine the receiver location, if ambiguity exists as to which of multiple phase determined points the receiver is located. The precision shape of the receiver path is determined (with a possible constant position offset) by selecting a likely location and projecting that location in time using carrier phase measurements without cycle slips.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
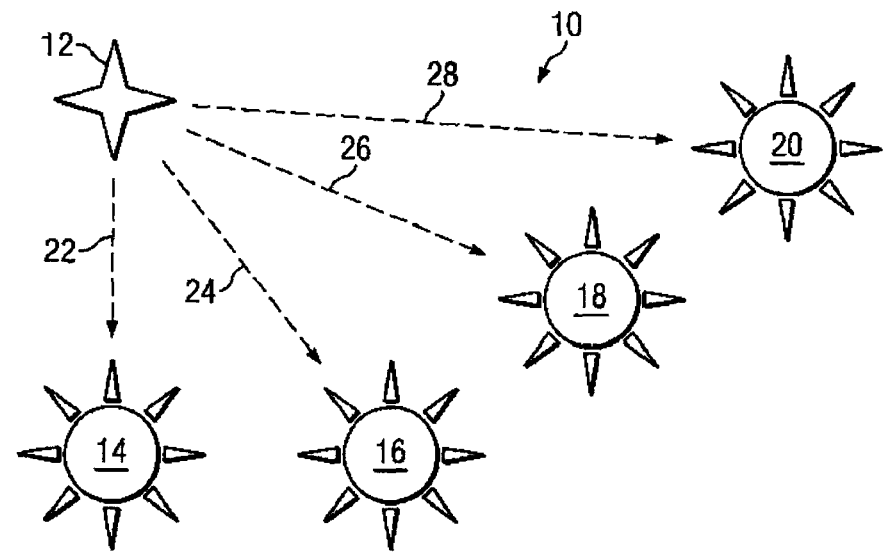
FIG. 1 illustrates an example geolocation system including a single transmitter being observed by multiple receivers.

Turning to FIG. 1, a geolocation system 10 including a single transmitter being observed by multiple receivers is shown. System 10 includes transmitter 12, as well as receivers 14, 16, 18 and 20, which receive radio signals along paths 22, 24, 26 and 28 respectively. An additional N number of receivers can be positioned to receive signals from transmitter 12. The range from the transmitter 12 to the $i^{th}$ receiver can be denoted as $\rho_i$. The time that it takes a radio wave to propagate from transmitter 12 to receiver i is $$\rho_i/c, \qquad (1)$$

where c=speed of propagation. Often the time-of-transmission of a waveform is unknown, so it is impossible to measure the time of propagation directly. But if the signal received at multiple locations is appropriately time-tagged, subsequent signal processing can measure the time-difference-of-arrival (TDOA) of signals at the receivers 14, 16, 18, 20, ..., N. This, in turn allows one to calculate the range difference between the $j^{th}$ and $i^{th}$ receivers as $$\Delta\rho_{ij}=\rho_j-\rho_i. \quad (2)$$

Typically there are two quantities that can be measured, modulation envelope and carrier phase. Although the propagation velocities of these quantities can be different in dispersive media (e.g. the ionosphere), variations in propagation velocity can be compensated for in many practical scenarios. Throughout the instant specification, propagation in a vacuum where both group and phase velocity are equal to the speed of light, c, is assumed. Measurements of when a specific feature of the envelope arrives allows one to measure a "group" TDOA. One approach to making this measurement is to calculate a cross-ambiguity function between signals from two receivers. This ambiguity function has a peak at the TDOA. At other times, the difference in phase between two receivers can be measured. On a narrowband signal, the difference in phase can typically be measured much more accurately than the measurement of the envelope time of arrival of the signal. However, one cannot usually resolve which carrier cycle is being observed. An n-cycle ambiguity in the measurement and one actually observes is described as $$\Delta\Phi ij=n+(\rho_j-\rho_i)/\lambda+\phi_{ij}\mathrm{err}, \quad (3)$$

where: n is an unknown integer, $\lambda$ is the radio's wavelength, and $\Phi_{ij}$err is the composite of all other errors.

The problem of resolving n and minimizing other errors is extremely difficult. It is common to solve this by measuring the frequency difference of arrival (FDOA). This can be done by taking the derivative of the phase difference $\Delta\Phi ij$ with respect to time. Often one can guarantee that a differential phase cycle is not slipped during the measurement interval. In this case n is constant and does not appear in the derivative. Likewise, $\phi_{ij}$err can be held constant or made very slowly varying. When FDOA is measured in this manner, one has a very precise measurement of the slant velocity difference of the transmitter observed at the two receivers:

$$\frac{d\Delta\Phi_{ij}}{dt}\lambda = \frac{d\rho_j}{dt} - \frac{d\rho_i}{dt}. \quad (4)$$

This measurement can in turn be useful in fixing position.

A measurement of $\Delta\rho_{ij}$ with the location of the two receivers known fixes the location of the transmitter to be on a hyperboloid surface with foci at the location of the two receivers. Each time that another receiver is added into the observing complex, another hyperboloid is determined. So with simultaneous measurements from 4 receivers, the intersection of 3 hyperboloids determines a location in 3-dimensional space. Note that with 4 receivers, one can compute (4−1)!=6 differences, but only 3 are mathematically independent.

The problem is more complicated if phase difference is being measured. Measurement using a pair of receivers with an unknown carrier phase ambiguity, n, results in a series of possible hyperboloids on which the transmitter must lie. If the signal has a wavelength of a meter, then these hyperboloids are as close as one-half (½) meter along the baseline between the two receivers. Separation grows to be much larger if the transmitter is located many baseline lengths from the receivers or if it is off the ends of the receiver baseline. Each time an additional receiver is added to the observing mix, another hyperboloid is determined. Each of these additional hyperboloids also have ambiguities due to carrier phase ambiguities. The net result is a lattice of possible locations where these multiple hyperboloids intersect. The locations in this lattice can be separated on the order of a wavelength near the receiver baselines. Thus for a 300 MHz radio transmitter with 1 meter wavelength, the lattice spacing can be less than a meter in a region bounded by all 4 receivers. Of course, this spacing changes with geometry and becomes large if the transmitter is distant from a cluster of receivers.

A frustrating circumstance results where (neglecting biases) one might fix a transmitter's position to a small fraction of a wavelength if one could determine which of many possible ambiguous locations the transmitter lies on. Simply adding more observers does not directly solve the problem since each added observer also has an unknown cycle ambiguity. Consequently, the ratio of unknown to known quantities in the equation does not improve. However if multiple differential phase measurements are made while an observer moves, then the situation improves. As long as one does not slip a cycle between measurements, the unknown integer, n, is constant and adding another phase difference observation does not increase the number of unknowns.

Consider the example of a fixed receiver 1 and a moving receiver j. If two phase difference measurements are made at time t=1 and t=2, the following measurement-related equations result after scaling the measured phase difference in cycles by the wavelength, $\lambda$:

$$\Delta\rho_{1j}(1)=\rho_j(1)-\rho_1(1)+n_j\lambda+\phi_{1j}\mathrm{err}(1)\lambda \quad (5)$$

$$\Delta\rho_{1j}(2)=\rho_j(2)-\rho_1(2)+n_j\lambda+\phi_{1j}\mathrm{err}(2)\lambda \quad (6)$$

If we subtract these two measurements, if the location of the transmitter and receiver 1 are constant, and if the phase error terms are constant, we obtain:

$$\Delta\Delta\rho_{1j}(2,1)=\rho_j(2)-\rho_j(1) \quad (7)$$

This result of differencing the wavelength-scaled phase difference is to fix a hyperboloid on which the transmitter must lie with one foci where receiver j was at time1 and another foci where receiver j was at time 2. If the measurements are very closely spaced in time, and the motion is small relative to the transmitter range, this reduces to the common equation for FDOA where:

$$\mathrm{FDOA}=\Delta\Delta\rho_{1j}(2,1)/(\lambda(t_2-t_1)) \quad (8)$$

and the hyperboloid can be approximated by a cone with its apex at the average receiver position. This cone is rotated about the velocity vector, $\vec{v}$, and has a half angle, $\Psi$. This cone is the solution to the equation:

$$\mathrm{FDOA}=(|\vec{v}|/\lambda\cos(\psi)). \quad (9)$$

If successive measurements are made an aperture can be synthesized along the flight path with wavelength-scaled phase measurements relative to the starting point of $\Delta\Delta\rho_{1j}(2,1)$, $\Delta\Delta\rho_{1j}(3,1)$, $\Delta\Delta\rho_{1j}(4,1)$, $\Delta\Delta\rho_{1j}(5,1)$, $\Delta\Delta\rho_{1j}(6,1)$, etc. Since none of these measurements adds an unknown, it might seem that only $\Delta\rho_{1j}(2,1)$, $\Delta\Delta\rho_{1j}(3,1)$, and $\Delta\Delta\rho_{1j}(4,1)$ (formed by 4 wavelength-scaled phase difference measurements) would be necessary to solve for the location of an unknown transmitter. This might be true if the receiver were moved through a large geometrical change in two or three dimensions. However if the receiver motion is constrained to a line, measurements cannot solve for a rotational symmetry about the line. Furthermore, if the measurements are made in rapid succession with small receiver motion compared to the distance to the transmitter, the location of the transmitter along a range line projected from the moving receiver j will be determined much poorer than location in the cross-range direction. For these reasons, it is sometimes desirable to have more than one moving receiver in order to obtain a rapid and accurate fix on the transmitter's position.

The foregoing paragraphs described how to determine a location using phase measurements. Determining the location was not predicated upon resolving the integer phase ambiguities between widely separated receivers. In fact, locations can be determined even if the receivers have unknown non-integer (but constant) biases in phase.

Figure 2:
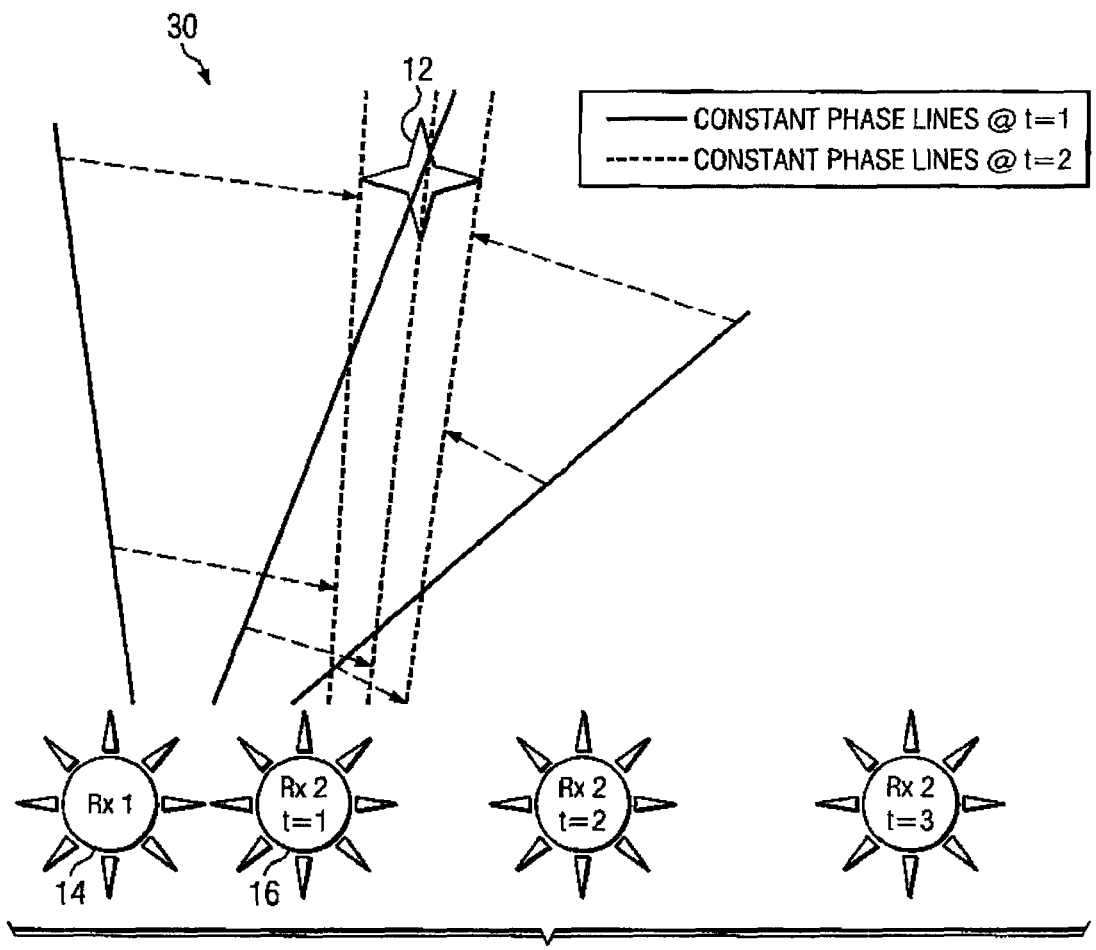
FIG. 2 illustrates a geolocation technique with an aircraft carrying two receivers, in range of a transmitter.

However, with a sufficient number of observers and proper geometry change, the location accuracy derived from the techniques described above can be good enough to resolve integer ambiguities and to calibrate additional unknown biases. Consider the simple planar example 30 in FIG. 2. An aircraft carrying receivers 14,16 is moving along a straight line. The aircraft is in range of transmitter 12 as depicted. At time t=0 the aircraft deploys fixed receiver 14. Prior to deployment of receiver 14, the receivers 14, 16 are calibrated so that there is negligible unknown phase bias, $\phi_{12}$err. At t=1 when physical separation is relatively small the first phase difference measurement is made. Because the initial separation is small, the physical distance between integer phase ambiguities is very large. Therefore, relatively coarse position measurements will resolve which integer ambiguity the transmitter 12 is located on. As differential phase measurements continue while receiver 16 flies away from receiver 14, two results occur. First, the accuracy of the hyperbolic surface's position increases as the baseline increases. Second, the spacing between potential integer ambiguities becomes smaller. As long as there is not a cycle slip, the decrease in ambiguity spacing doesn't affect the ability to resolve the ambiguities.

With two receivers 14, 16 separated 0.1 kilometer and with a $\lambda=1$ meter transmitter 12, ambiguities perpendicular to the two-receiver baseline are spaced 0.01 radians. At a range of 10 kilometers, an unknown integer cycle difference results in an ambiguity separated by 100 meters. When receiver 16 has moved so that the baseline is 1 kilometer, the distant ambiguities are now spaced 10 meters apart. Then if an additional measurement is taken when the receivers are separated by 2 km, the ambiguities are spaced 5 meters apart and intersect the original phase line of position with an angle of roughly 0.1 radians or 6 degrees. As FIG. 2 demonstrates, lines of constant phase move with receiver 16 motion, except that the position of the correct ambiguity remains fixed while lines of constant phase pivot about it.

In the discussion thus far, is has been assumed that the transmitter 12 is stationary. The concept of using a fixed receiver 14 with one (or more) moving receivers 16, 18, etc., was described. It was shown that differential phase measurements between a fixed and moving receiver could be processed so that integer ambiguities and phase biases between the two receivers have no effect. It was also shown that, in terms of resolution, the result is equivalent to a synthetic aperture lying along the trajectory of the moving receiver. There are multiple advantages to conceptualizing a synthetic aperture differential phase (DF). A primary motivation is the ability to form an image to resolve more than one simultaneous transmitter 12 or to resolve a direct path and multipath reflections. Resolving the phase ambiguity of widely spaced receivers may lead to even more precise geolocation than possible using synthetic aperture techniques where phase ambiguities are not resolved.

For years FDOA techniques for geolocating transmitters have failed whenever there is unknown transmitter motion. Depending on the velocities and geometries of the receivers involved, even very small motion such as a ship steaming across the ocean or a person walking through a park would introduce unacceptably large geolocation errors. Attempts to "fix" this usually involved modeling and making certain assumption about the transmitter motion. For example, one might model a ship as having a constant course and speed and try to estimate these parameters along with latitude and longitude. This approach is not satisfactory in many situations, however.

The present invention teaches a different approach by adding enough observers so that the motion can be determined along with other parameters. As noted earlier, an instantaneous measurement of TDOA determines range difference between two receivers 14, 16: $\Delta\rho_{ij}=\rho_j-\rho_i$ (refer to Equation 2). This, in turn, fixes a hyperboloid on which the transmitter 12 must lie with the foci being the locations of the $i^{th}$ and $j^{th}$ receivers. Three independent difference measurements can be made between pairs of four receivers, and the intersection of these three hyperboloids can fix the transmitter's location in three dimensional space. Again, if the phase difference measurements have an ambiguity of one or more carrier cycles, a lattice of possible locations can be determined.

Consider the following example of a moving transmitter 12 which is observed by five receivers (four fixed and one in motion). Assume that a sequence of differential phase measurements are made by the four receivers without slipping any cycles. For each possible starting location, there is a unique differential phase bias constant consisting of an unknown integer ambiguity plus an unknown constant bias. For each possible starting location, the subsequent trajectory of the transmitter can be computed from the measured phase differences. If there are N possible starting locations, there are N possible trajectories, one for each assumed starting location. These starting locations might be ambiguous positions on the lattice discussed above, or they might be a list of potential locations known from other outside information. Since the differential phase measurement is very precise (often a centimeter or better), the motion relative to each possible starting point may be extremely precisely known.

Suppose a fifth observer is added. It is mathematically possible that having a fifth observer will allow for a unique trajectory to be defined. By way of example, consider a scenario where there are 4 observers at great distance and a $5^{th}$ observer nearby. This might be the situation when the transmitter 12 was known to be in a particular city, and the 4 observers (e.g., receivers 14, 16, 18, 20) were on distant satellites. If the satellites were sufficiently distant, range changes in the direction of a particular satellite would be essentially independent of where in the city the transmitter 12 was. So the shape of the transmitter trajectory could be calculated based on observations of the 4 distant observers, and this trajectory shape would be virtually identical regardless of where in the city the transmitter was.

A phase difference measurement could then be formed between the fifth receiver and one of the original four. For each different location of a transmitter 12 starting point, the estimated trajectory shape is applied to get an estimated trajectory. The range difference vs. time between the fifth receiver and $i^{th}$ receiver, $\rho_{i5}(t)$, can then be computed based on the transmitter trajectory. The residual difference between the observed phase difference (in cycles) and the computed $\rho_{i5}(t)/\lambda$ is an indication of the goodness of the estimate. This residual is minimized when the best starting point is chosen. So by moving the hypothetical starting point in three dimensional space, the "best fit" residual can be determined. The trajectory producing this "best fit" residual is assumed to be the best estimate of transmitter position and motion.

It should be pointed out that there are bad and good locations for this fifth receiver. Positioning the fifth receiver at a large distance from the city would be bad since there would be only small differences in the range vs. time to it regardless of where in the city the transmitter starting point was. On the other hand, a fixed receiver in the city near the trajectory of the transmitter would see a very large range/phase change when the transmitter passed near to the receiver, and this would greatly help constrain the transmitter's motion.

The key factor to accurate transmitter location with four receivers essentially fixed in the sky seems to be having large angular motions between the transmitter and the remaining fifth receiver. Since one cannot rely on the transmitter always having large motion (and in fact it might be stationary) it is normally best for receiver five to have significant motion.

If there is no transmitter motion, this degenerates to a situation identical to the location results for the two-receiver synthetic aperture case with one fixed and one moving receiver. As previously discussed in that case, the path covered by the moving receiver can be viewed as a synthetic aperture upon which the phase is known.

In the special case of four extremely distant receivers, one can apply a transform to make it identical to the case of a fixed transmitter and one moving receiver. This is done by first using the 4 distant receivers to calculate the transmitter's position vs. time:

$$\vec{X}(t)=\vec{X}_o+\vec{X}_R(t), \quad (10)$$

where $\vec{X}_o$=Unknown initial transmitter position in a fixed coordinate system. $\vec{X}_R(t)$=Position vector between initial position, $\vec{X}_o$ and current position. This is the trajectory estimated from measurements on four distant receivers. Next, one can apply a coordinate transform to obtain a new coordinate system:

$$\vec{y}(t)=\vec{x}(t)-\vec{X}_R(t) \quad (11)$$

In this coordinate system the transmitter is fixed at location $\vec{Y}_o=\vec{X}_o$ that has yet to be estimated. The moving receiver five is at location $\vec{Y}_5(t)=\vec{X}_5(t)-\vec{X}_R(t)$, and the formerly $i^{th}$ fixed receiver is now at location $\vec{Y}_i(t)=\vec{X}_i-\vec{X}_R(t)$.

In order to make the analogy with one fixed and one moving receiver more exact, one can now compute the motion of the $i^{th}$ receiver imparted by motion of the coordinate system origin, and remove it from any data measurements made that involve the $i^{th}$ receiver. Specifically, range change correction due to coordinate system motion is the dot product $$\vec{X}_R(t) \cdot \vec{u}_i, \quad (12)$$

where $\vec{u}_i$ is the unit vector in the direction of the $i^{th}$ receiver.

In some situations, all of the receivers (e.g., 14, 16, 18, 20, 22) are moving. An example would be when all receivers are on moving aircraft or satellites. Consider a moving transmitter 12 at position $\vec{X}_o(t)$ and moving receivers at positions $\vec{X}_i(t)$ where i=1, 2, . . . , N The phase in wavelengths between the transmitter at $\vec{X}_o(t)$ and the output of the $i^{th}$ receiver at $\vec{X}_i(t)$ at time t=k is $$\Phi_i(k)=|\vec{X}_i(k)-\vec{X}_o(k)|/\lambda+\Theta_i, \quad (13)$$

where $\Theta_i$=an unknown constant phase offset of the receiver and $\lambda$=the transmitter wavelength.

Assuming that the transmitter 12 moves in three dimensions in a random fashion, each time a measurement is made, there are three new unknowns representing the change in transmitter location. Each receiver is assumed to have an unknown phase offset, so each receiver introduces a phase unknown the first time that it is used for a measurement. However subsequent measurements with the same receiver do not introduce any additional unknowns as long as the phase offset is constant. It is well known that as long as equations are independent, it is possible to solve for all the unknowns as long as the number of measurements are larger than the number of unknowns.

In the case of an example geolocation technique having five receivers, a first assumption can be that all receivers are phase locked together. One will only work with phase difference measurements between receivers. So with five receivers, one can make four independent phase difference measurements at each measurement time. It is assumed that the first measurement is at t=0. At this time, one has three position unknowns and four phase difference unknowns. The four phase difference unknowns are the initial phase offsets between each of four receivers and an arbitrarily chosen fifth receiver. At t=1, four more measurements are taken. There are three additional unknowns added, the position change from t=0 to t=1 in three dimensions. The phase difference between receivers remains fixed, so no new unknowns are added by the receivers.

At each new measurement time, we add four measurements and three position-change unknowns. As a result, the number of measurements slowly approaches the number of unknowns. To illustrate, after the first measurement at t=0 there are 3+4=7 unknowns and 4 measurements. After the second measurement at t=1 there are (3+4)+3=10 unknowns and 4+4=8 measurements. After the third measurement at t=2 there are (3+4)+3+3=13 unknowns and 4+4+4=12 measurements. Finally, after the $4^{th}$ measurement there are (3+4)+3+3+3=16 unknowns and 4+4+4+4=16 measurements. At this point if the measurements are sufficiently geometrically diverse, it is possible to solve for the unknown three-dimensional position after only four sets of measurements among the five receivers.

The same conclusion is reached when all five receivers are moving that one reaches with four stationary receivers and one moving receiver. Again, in the former case, good geometrical situations one could solve for a transmitter's location after motion in three directions. Starting with a measurement at the start of each of the three motions and ending with a measurement at the end of the last motion, a minimum of four measurements are required. to define transmitter location at each of the 4 measurement points.

In a similar manner, it is possible to make five independent phase difference measurements between six receivers. After the first measurement at t=0 there are 3 position unknowns and 5 phase difference unknowns for a total of 8 unknowns. After the second measurement at t=1 there are (3+5)+3=11 unknowns and 10 measurements. After the $3^{rd}$ measurement at t=2 there are (3+5)+3+3=14 unknowns and 15 measurements, and it is possible to solve for the unknowns with one extra degree of freedom (an overdetermined data set).

In a seven-receiver case we can make six independent pairs of measurements. The first measurement at t=0 introduces (3+6)=9 unknowns and 6 measurements. The second measurement (3+6)+3+3=12 unknowns and 12 measurements. So the location can be determined after measurements are made at two times.

Two successive phase measurements may be regarded as a frequency measurement since frequency is rate of change of phase. As a result, the seven-receiver case of making two successive phase measurements between six independent pairs of receivers may be alternatively regarded as making six frequency difference measurements. Taking this view, six independent frequency difference measurements can be used to solve for 6 unknowns. The unknowns are position (x,y,z) and velocity ($v_x, v_y, v_z$).

An important issue when using differential phase measurements is tracking collector position extremely precisely. This issue especially arises when one of the collectors is an aircraft with a flight path perturbed by turbulence. Consider the FIG. 2 example of an aircraft flying along a straight line. In practice the perturbed the flight path is only approximately a straight line. If the true collector trajectory deviations are precisely known, then one can straightforwardly calculate, for a hypothetical transmitter position, how these trajectory deviations affect the received signal's phase.

In order to calculate the transmitter's position based on differential phase measurements, or equivalently image it's position, one must know the collector trajectory to a small fraction of the transmitter's wavelength. The same is true when estimating collector velocity in order to geolocate using FDOA. It is important to note that for these purposes a constant bias error in collector position often has much less effect than deviations in the collector path. The conclusion is that, for purposes of FDOA, aperture synthesis, and related geolocation techniques, GPS carrier phase measurements can make dramatic performance improvements without the need resolve all GPS carrier phase ambiguities. Consider the FIG. 2 example where phase change is observed while the collection platform 12 moves over a baseline of 100 meters. If a 10 km distant 300 MHz transmitter signal's phase change is measured to 1/100 of a cycle (1/100 of a meter with 1 meter wavelength), then the transmitter location's cross-range error is 1/10000 of a radian or 1 meter.

If the collector position undergoes an un-compensated 1 meter error toward or away from the transmitter over these 100 meters, then the error in transmitter position determination increases to 1/100 radians or 100 meters in cross-range at a 10 km transmitter distance. If on the other hand the trajectory shape is known to 1/100 of a meter relative accuracy, then cross-range geolocation error is only the original absolute position error summed with another 1 meter cross-range error. Effects on measurement accuracy of transmitter range using phase curvature across the synthesized aperture can be even more dramatic.

The conclusion is that in these situations the collector's trajectory shape is more important than its absolute position. As a result it is often not necessary to perform ambiguity resolution in GPS measurements of the collector position to derive the benefits of GPS carrier phase measurements.

Another observation is that differential phase measurements on other navigation signals such as Galileo or WAAS can also serve to make precise precision trajectory shape measurements. In fact, it is not even necessary to use a navigation signal in order to improve the trajectory shape as long as the transmitter location is known and the transmitter is simultaneously observed by both collectors.

A final important problem that has been solved is to calibrate drifts in the reference oscillators at separated collectors. The usual approach when making precision measurements is to use Rb or even Cs reference oscillators. But even these oscillators are not sufficiently accurate and stable for many aperture synthesis geolocation tasks. This is especially true for aircraft oscillators that are subject to acceleration and temperature changes.

When observations of GPS carrier phase and/or other known-location transmitters form an overdetermined data set, the phase drift of the local oscillators can be measured. For example, consider the case of where GPS carrier phase is used to track a collector's position change over 10 minutes. If the collectors also have a view of WAAS, then the drift in phase of the WAAS signal can be measured at each collector. When the calculated motion of the collector is removed from this data set, the residual error is dominated by the oscillator phase drift and any errors in the WAAS signal. By this means the WAAS signal is used to calibrate any oscillator phase drift. This means that we can also use a less expensive collector oscillator in many situations.

Finally, by differencing measurements on a WAAS signal in common view from two collectors the WAAS signal's drift largely cancels leaving one with even better differential phase measurements. This is of course a major objective.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of geolocating a moving transmitter at position $\vec{X}_o(t)$ observed by a plurality (N) of moving collector devices at positions $\vec{X}_i(t)$, comprising:
   (1) obtaining (N−1) wavelength-scaled phase difference measurements taken from independent pairwise combinations of the plurality of moving collector devices at a plurality of discrete times, the first measurement taken at k=0, according to $\Delta\Phi_{ij} = \Phi_j(k) - \Phi_i(k)$, and $\Phi_i(k) = |\vec{X}_i(k) - \vec{X}_o(k)|/\lambda + \Theta_i$ where:
   i and j are each one of the plurality of collectors (i,j=1, 2, . . . , N)
   $\Theta_i$ and $\Sigma_j$ are unknown constant phase offsets of the plurality of moving collector devices,
   $\lambda$ is the transmitter wavelength, and
   k is the discrete time;
   (2) differencing said plurality of the (N−1) wavelength scaled phase difference measurements, resulting in a plurality of values of range differences to the transmitter associated with pairwise combinations of receivers;
   (3) on the basis of the plurality of values of range differences to the transmitter associated with pairwise combinations of receivers, calculating a lattice of points representing potential transmitter locations;
   (4) repeating steps 1-3 over time as at least one receiver is moved, resulting in multiple lattices of potential transmitter location;
   (5) comparing the lattices generated by steps 1-4 to narrow the selection of potential transmitter locations.

2. The method of claim 1, wherein prior to obtaining wavelength-scaled phase measurements, moving collector devices are phase-locked together.

3. The method of claim 1, wherein a motion path of at least one of the plurality of moving collector devices is determined by measuring global positioning system (GPS) or global navigation satellite system (GNSS) carrier phase and solving using real-time kinematics (RTK) techniques.

4. The method of claim 1, wherein a shape of a motion of at least one of the plurality of moving collector devices is determined from carrier phase or differenced carrier phase of global positioning system (GPS), global navigation satellite system (GNSS), or known-location transmitters in common view without resolving carrier phase ambiguity.

5. The method of claim 1, wherein positions of multiple simultaneous transmitters are computed by summing range-corrected complex-conjugate multiplies of paired signals, the signals appropriately weighted by signal quality factors.

6. The method of claim 5, further including forming images, multi-dimensional probability distributions, or other means to represent the positions of multiple simultaneous energy sources.

7. The method of claim 1, wherein at least one receiver is moved in two directions.

* * * * *